Patented Dec. 13, 1949

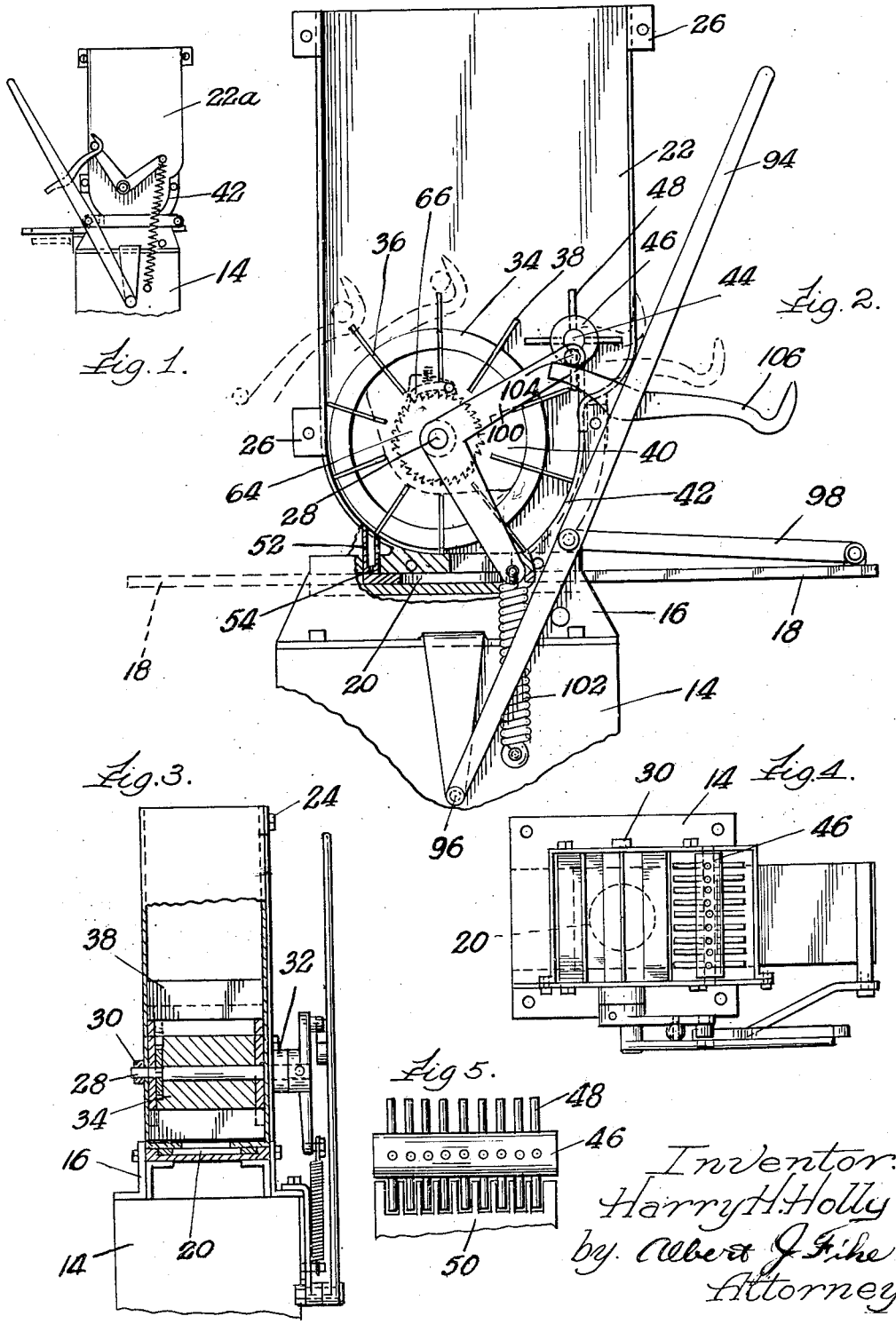

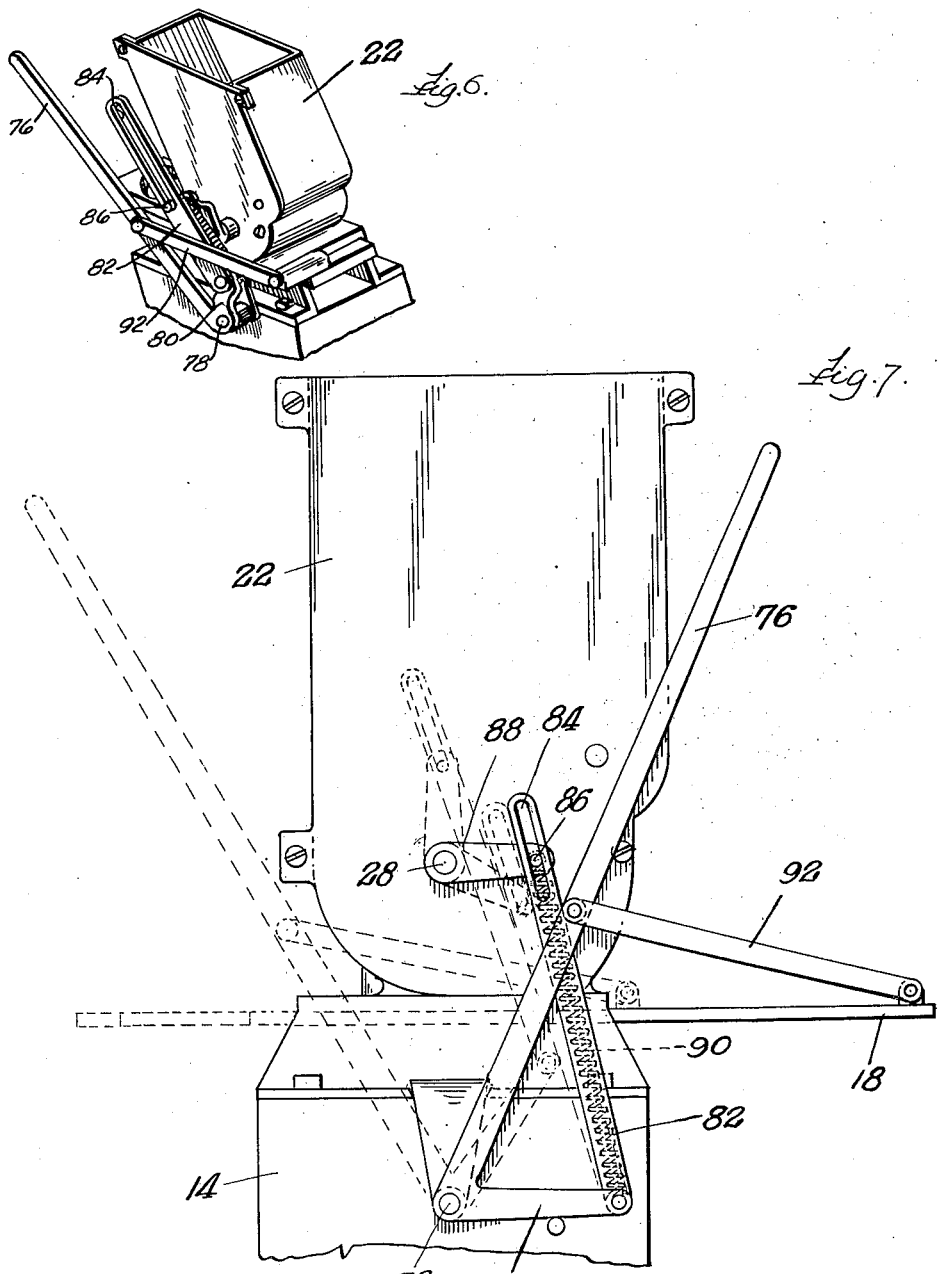

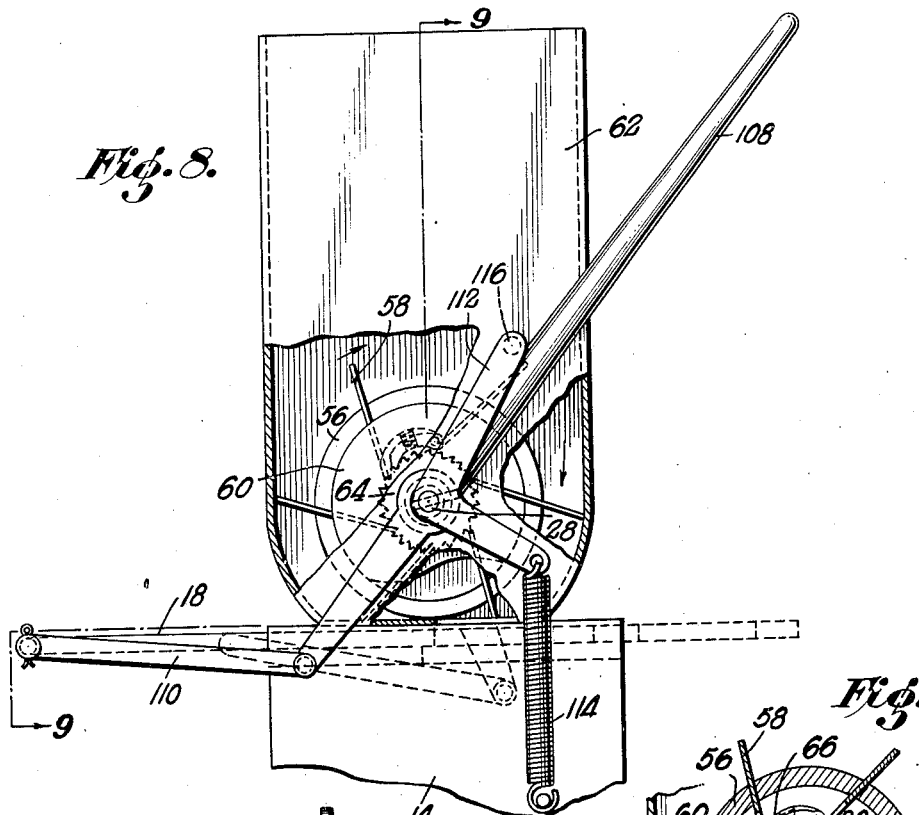
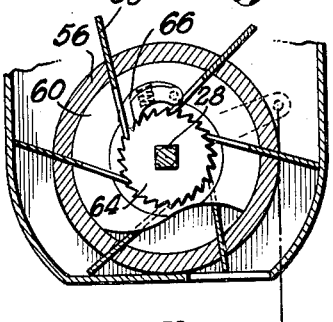
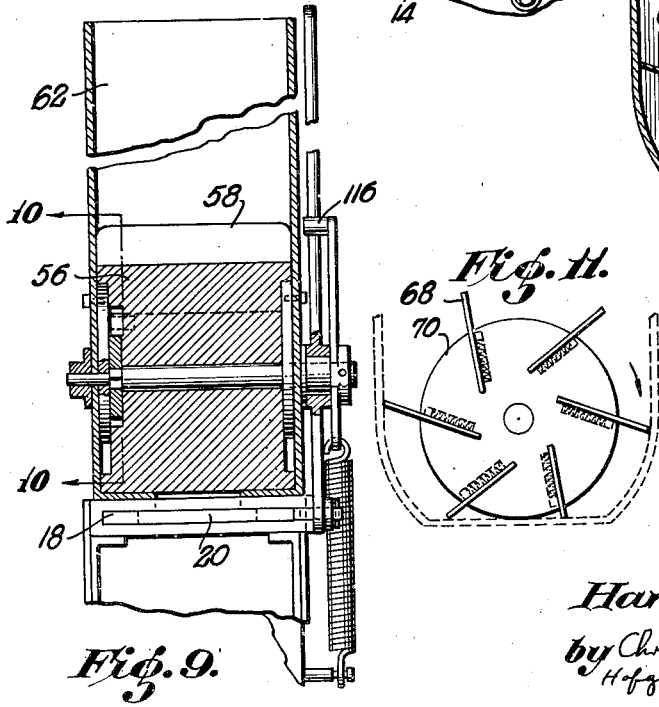
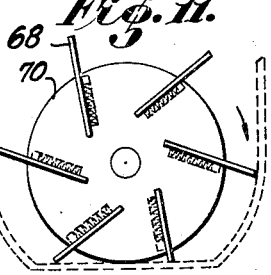
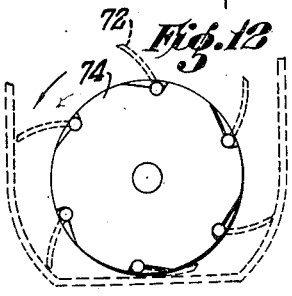

2,491,179

UNITED STATES PATENT OFFICE 2,491,179

FEEDING APPARATUS HAVING ROTATABLE CYLINDER WITH VANES ARRANGED FOR FREE ENGAGEMENT CONNECTION WITH AUXILIARY DRUM

Harry H. Holly, Chicago, Ill., assignor, by mesne assignments, to Holly Molding Devices, Inc., Chicago, Ill., a corporation of Illinois Application July 9, 1943, Serial No. 493,997

7 Claims. (Cl. 222—231)

This invention relates to an improved feed and measuring means for plastic material, and the device is particularly adapted for use in making meat patties such as are commonly used in the preparation of the food commodity ordinarily known as a "hamburger."

One of the important objects of this invention is to provide an apparatus into which a quantity of ground meat or other plastic material may be placed and which, upon operation of the apparatus, will be fed into a measuring means, which means will accurately portion and shape the meat or other plastic material after which the measured and shaped portion is ejected from the machine and can be removed for a repetition of the operation.

The device can be either hand operated or can be readily adapted for mechanical operation and, with little or no change, can be applied to an automatic portioning and molding mechanism such as is shown and described in my pending application for patent on such a device, which was filed March 22, 1941, Serial No. 384,656, which has issued as Patent No. 2,338,939 dated, January 11, 1944.

In that particular application a combination hopper and feed mechanism is shown and described, and the present application relates to an improvement of such combined hopper, portioning and feed mechanism.

One of the principal objects of this invention is to provide a feeding and portioning apparatus especially for ground meat used in hamburger patties, which will positively feed the ground meat into the measuring and portioning element under almost unvarying conditions of pressure, and regardless of the consistency of the meat. It has been found that ground meat having a large proportion of fat therein behaves differently than ground lean meat, and very cold or frozen meat behaves differently than warm ground meat. The particular machine of this invention is adapted to handle ground meat under all these varying conditions of consistency, temperature, moisture content and the like, without any undue extra attention on the part of the operator.

Another and still further important object of the invention is to provide a meat portioning and feeding means into which a quantity of meat may be placed and which, upon subsequent operation of the machine, will be automatically fed through the machine subdivided into accurately measured portions, and this operation will take place until all the meat is used, there being practically no residual material.

Another object of the invention is to provide a completely sanitary apparatus in which the meat is or can be handled without contact with human hands, and which, furthermore, can be easily kept clean, the same having a minimum number of parts and being adapted for ready disassembling for cleaning purposes.

Other and further important objects of the invention will be apparent from the disclosures in the accompanying drawings and following specification.

The invention, in a preferred form, is hereinafter more fully described.

In the drawings:

Figure 1 is a side elevation of the improved feed and measuring means for plastic material of this invention, the same illustrating a preferred embodiment thereof.

Figure 2 is an enlarged view of the structure illustrated in Figure 1, with one side or cover portion being removed to show the interior construction, and with certain operational steps illustrated in dotted lines.

Figure 3 is an end view of the device, parts being broken away and other parts being shown in section.

Figure 4 is a top plan view of the apparatus, illustrating the construction and operation of the feed means and showing the opening in the measuring slide plate in dotted lines.

Figure 5 is a detail view of the auxiliary feed roll with its feeding fingers and showing the same associated with the meat stripping comb which co-operates therewith.

Figure 6 is a perspective view showing the machine with a slightly modified form of operational levers thereon.

Figure 7 is a side elevation of the apparatus of Figure 6, illustrating the operation in dotted lines.

Figure 8 is a side elevation showing a further modified form of the invention.

Figure 9 is a sectional view taken on the line 9—9 of Figure 8, looking in the direction indicated by the arrows.

Figure 10 is a detailed view of the feeding cylinder and vanes of Figure 8.

Figure 11 illustrates a slight modification of the feeding cylinder and vanes.

Figure 12 shows a further modified form of the feeding cylinder.

As shown in the drawings:

The reference numeral 14 indicates generally the supporting base of the improved feed and measuring means of this invention, and as heretofore explained, this may be either a simple support adapted to be applied in position on a table, work bench or the like, or instead of such a supporting base, the entire apparatus may be mounted upon the mechanism shown in my prior United States Patent No. 2,338,939, dated January 11, 1944. In such case, the manual operating means herein disclosed can be supplanted by the mechanical operating means of my aforesaid patent.

Mounted upon the base 14 or upon the machine of my aforesaid patent is a support 16, in which support is reciprocatively positioned a slide plate 18. This slide plate has an opening therein, as indicated at 20, and this opening is of a calculated size so that a desired portion of meat will be forced thereinto and accurately measured at each reciprocation of the plate. The opening is preferably circular in shape, as shown in Figure 4, but can be of some other shape.

Positioned upon the support 16 is the hopper 22, which is preferably of the shape shown in Figures 1, 2, 6 and 7, and one side plate 22a of this hopper can be made removable for ready disassembling of the entire apparatus. Bolts 24 fitted into openings in extending flanges 26 hold the side plate 22a in position.

A shaft 28 is mounted in the hopper, passing from one side to the other thereof, the ends of this shaft being supported in suitable bearings 30 and 32. Rotatably mounted on the shaft is a cylinder or feed drum 34, which has a series of radial slots 36 cut thereinto and extending from the periphery to a little more than halfway to the center in each case.

In each of these slots is slidably fitted a vane 38 of the same depth as the slot. Two platelike cams 40 are fitted into corresponding recesses in the ends of the cylinder or drum 34. Each of these cams is shaped as shown by the dotted lines in Figure 2 and is adapted to be fastened to the side plate of the hopper. Each cam acts upon inner ends of each of the vanes 38 so that as the drum rotates, each vane will, as it is brought upwardly by the drum, be forced outwardly as shown. The drum rotates in a clockwise direction, as viewed in Figure 2, and the projecting vanes 38 will push any meat in contact with the upper face of the drum toward the right and down into the space between the face of the drum and the corresponding face 42 of the hopper.

It will be noted that the curved face 42 of the hopper is concentric with the face of the drum until the bottom of the hopper is reached, which bottom is parallel to the upper face of the measuring or slide plate 18. When the edge of the vane reaches the bottom of the hopper, the vane is caused to move inwardly by contact of the outer edge of the vane with the bottom of the hopper. The vane moves inwardly against the cut away portion of the cam 40, and this inward motion of the vane squeezes the meat between this vane and the adjacent one into the opening 20 in the slide plate 18. The outer edges of the vanes are then practically flush with the periphery of the cylinder or drum 34 and this condition remains until each vane has traveled through an upward movement of around 90 degrees from the bottom, whereupon the cam 40 again forces the vanes outwardly for a further feeding operation.

Mounted on the shaft 44 which extends across the hopper at a point about the level of the top of the drum 34 is an auxiliary feeding cylinder 46, having a series of aligned radial prongs 48 fitted thereinto, as best shown in Figures 2 and 5. Adjacent the bottom of this cylinder 46 is a comb-like element 50 having slots in its upper edge, through which slots the pins or prongs 48 of the feed roll 46 are adapted to pass as the roll is rotated. Rotation of this roll is accomplished by means of the faces of the vanes 38 contacting the ends of the prongs 48 as the drum 34 with its vanes 38 is rotated. The action of this cylinder 46 with its prongs is to force meat or other plastic material which might otherwise rest against the back of the hopper 22 into position above the main feed drum 34 and in front of the descending vanes 38. As will be evident, the hopper is offset to receive the auxiliary feed drum 46.

As shown in Figure 2, any air which is trapped with meat and which would otherwise be forced into the opening 20 in the slide plate 18 when the meat or other material is fed thereinto, is allowed to escape by means of an air release tube 52. This is mounted just ahead of the rearmost position of the opening 20 in the slide plate 18, so that air trapped in the opening 20 will be allowed to escape and more meat allowed to flow in before the opening 20 in the slide plate 18 gets beyond the feeding action of the drum 34 and vanes 38.

The air release tube 52 is formed with a restricted orifice 54 so that while the air is allowed to escape, only a small amount of meat or other plastic material can possibly pass therethrough, and the tube 52 opens into the bottom of the hopper adjacent the periphery of the drum 34 and at a point where the upward movement of the vanes is begun. Any meat which does get through the restricted orifice 54 would accordingly be merely carried back into the hopper.

In Figure 8, a slightly modified form of the invention is shown, wherein a feed drum or cylinder 56 is provided, having six vanes 58 as distinguished from the ten vanes 38 of the drum 34. These vanes 58 are positioned in slots in the drums 56, which however are not radial slots. A cam 60, similar to the cam 40, is employed for moving the vanes 58 in and out of the drum 56 as it is rotated. The slide plate 18 is the same as that previously described, and its mounting with relation to the hopper 62 is also similar.

In all these constructions the cylinders 34 and 56 are rotated by means of a ratchet gear 64, which is fitted into a recess in one face of the cylinder, and this ratchet gear is fixed on the central shaft 28. A spring-pressed pawl 66 co-operates with the ratchet gear, and as the shaft 28 and the ratchet gear 64 are rotated, the pawl 66 being mounted on the cylinder 34 or 56, will rotate the cylinder.

In the modification shown in Figure 11, the vanes 68 are spring-pressed outwardly from the periphery of the drum or cylinder 70, this construction eliminating the necessity of a cam such as those shown at 40 and 60.

In the modification shown in Figure 12, the vanes 72 are pivotally mounted in recesses in the periphery of the drum or cylinder 74, and are spring pressed into material feeding position. In this instance the drum is rotated in a counterclockwise direction, as indicated by the arrow in Figure 12.

The means for rotating the feed cylinders may be mechanical, such as the mechanical means illustrated in my prior patent No. 2,338,939, or some suitable manually operated means may be employed.

For example, in the device shown in Figures 6 and 7, a handle 76 is pivoted at 78 to the base 14, this handle being in the form of a bell crank lever, having a short arm 80. To the outer end of this short arm 80 is pivotally connected a link 82 having a slot 84 in its free end and into this slot is fitted a pin 86 fixed on the end of a lever 88 mounted on the shaft 28. A tension spring 90 connects the end of the lever 88 with the end of the bell crank arm 80. A link 92 also connects the middle portion of the handle 76 to the end of the slide plate 18.

As the handle 76 is moved to the left, as shown in Fig. 7 the link 82 will move the lever 88 with its connected shaft 28 in a counterclockwise direction, as shown by the dotted lines, and on a return motion of the handle 76, the slot 84 will permit the lever 88 to remain in its rearmost position, except for the fact that the spring 90 is being tensioned and will have a tendency to pull the lever 88 with the shaft 28 and the fixed rachet gear 64 around in a clockwise direction. The rachet acting against the pawl 66 will tend to move the drum 34 in the same direction, this tendency, however, being limited by the tension on the spring 90.

In this manner, if there should be a large amount of meat or other material trapped between two adjacent vanes 38, the cylinder 34 under the tension of the spring 90 will move only a distance sufficient to force a desired measured amount of meat into the opening 20 in the slide plate 18. The remainder, trapped between two adjacent vanes, will be held under pressure until such time as the slide plate 18 has been moved forwardly and the measured segregated portion of meat removed therefrom by manual or mechanical means. When the opening 20 is again moved rearwardly into position beneath the opening in the bottom of the hopper, the spring tension on the rachet gear, pawl, cylinder and vanes will again fill the opening 20. If a sufficient amount of material is not trapped between two adjacent vanes, the spring will obviously move the drum through more of a revolution, thereby assuring a complete filling of the opening in the slide plate at each reciprocation of the handle 76.

A somewhat similar structure is illustrated in Figures 1 to 4, inclusive, wherein is disclosed a handle 94 pivoted at 96 on the base 14 and having a link 98 connected to the slide plate 18. A bell crank 100 is mounted on the shaft 28, one end of this bell crank being connected to a tension spring 102 fastened to the base 14.

The other arm of this bell crank has a projecting pin 104, which is adapted to be contacted by a ratchet 106 fixed on the handle 94 and moved into successive positions, as shown by the dotted lines in Figure 2. The corresponding action through the ratchet gear 64, pawl 66 and cylinder 34 is the same as that resulting from the mechanism illustrated in Figures 6 and 7.

A further manual means of operating the device is shown in Figures 8 and 9, wherein a handle 108 is provided, this handle being pivoted on the shaft 28 and having its lower end connected by means of a link 110 to the slide plate 18.

A bell crank lever 112 is fixed on the shaft 28 and has one arm connected to a tension spring 114 connected to the base 14. The other arm of the bell crank lever 112 has at its end a projecting pin 116 which is adapted to be contacted by the handle 108 to provide a reciprocating movement of the shaft 28 and attached pawl 64, and the consequent spring tension on the cylinder 56 tending to always rotate it in a clockwise direction.

Quite obviously, the mechanism of my aforesaid prior patent may be used to operate the feed means of the various hoppers described in this application, and a mechanical means for removing the measured portion of meat from the slide plate may be employed, as for example, the knock-out ring 64 shown and described in said prior application for patent.

I am aware that may changes may be made and numerous details of construction varied throughout a wide range without departing from the spirit of the invention, and I therefore do not purpose limiting the patent granted hereon otherwise than as necessitated by the prior art.

I claim as my invention:

1. A feeding apparatus for plastic material, comprising: a hopper having an opening in the bottom thereof; a cylinder rotatably positioned in the hopper adjacent said opening; a plurality of vanes each slidably mounted in a slot in the cylinder and normally projecting from the peripheral face thereof; cam means in the hopper and associated with the cylinder for moving the vanes into and out of said slots, the outer edges of the extended vanes contacting a portion of the inner wall of the hopper to force material into said opening, said portion of the inner wall being adjacent to and above the hopper opening; an auxiliary feed drum also rotatably mounted in the hopper and positioned adjacent to the first cylinder and immediately above the area of contact of said vanes with said inner wall when the vanes are forcing material out of said opening; a plurality of spaced prongs projecting from said drum; a stripper member associated with said prongs for stripping material therefrom; and means for rotating the cylinder and drum so that the extended vanes on said cylinder move toward said opening.

2. A feeding apparatus for plastic material, comprising: a hopper having an opening in the bottom thereof; a cylinder rotatably positioned in the hopper adjacent said opening; a plurality of vanes each slidably mounted in a slot in the cylinder and normally projecting from the peripheral face thereof; cam means in the hopper and associated with the cylinder for moving the vanes into and out of said slots, the outer edges of the extended vanes contacting a portion of the inner wall of the hopper to force material into said opening, said portion of the inner wall being adjacent to and above the hopper opening; an auxiliary feed drum also rotatably mounted in the hopper and positioned adjacent to the first cylinder and immediately above the area of contact of said vanes with said inner wall when the vanes are forcing material out of said opening; a plurality of spaced prongs projecting from said drum; a stripper member associated with said prongs for stripping material therefrom; and means for intermittently and substantially simultaneously rotating the cylinder and drum so that the extended vanes on said cylinder move toward said opening.

3. A feeding apparatus for plastic material, comprising: a hopper having an opening in the bottom thereof; a cylinder rotatably positioned in the hopper adjacent said opening; a plurality of vanes each slidably mounted in a slot in the cylinder and normally projecting from the face thereof; cam means in the hopper and associated with the cylinder for moving the vanes into and out of said slots, the outer edges of the vanes contacting the inner wall of the hopper adjacent and above the hopper opening for a portion of their travel to force material into said opening; an auxiliary feed drum also rotatably mounted in the hopper and positioned adjacent the first cylinder and immediately above the area of contact of said vanes with said inner wall when the vanes are forcing material out of said opening; a plurality of spaced prongs projecting from said drum, said prongs being contacted by said vanes for rotation of said drum; a stripper member associated with said prongs for stripping material therefrom; and means for rotating the cylinder and drum.

4. A feeding apparatus for plastic material, comprising: a hopper having an opening in the bottom thereof; a rotatable shaft arranged transversely of the hopper; a cylinder rotatably positioned in the hopper and rotatably mounted upon said shaft; a plurality of vanes each slidably mounted in a slot in the cylinder and normally projecting from the peripheral face thereof; cam means in the hopper and associated with the cylinder for moving the vanes into and out of said slots, the outer edges of the extended vanes contacting the inner wall of the hopper to force material into said opening, said portion of the inner wall being adjacent to and above the hopper opening; an auxiliary feed drum also rotatably mounted in the hopper and positioned adjacent to the first cylinder and immediately above the area of contact of said vanes with said inner wall when the vanes are forcing material out of said opening; a plurality of spaced prongs projecting from said drum; a stripper member associated with said prongs for stripping material therefrom; a ratchet mounted on said shaft for rotation therewith; an associated pawl on the cylinder mounted for rotation therewith; and means for rotating the shaft through a partial revolution and back again, said back rotation causing engagement of the ratchet with the pawl to rotate the cylinder so that the extended vanes on said cylinder move toward said opening.

5. A feeding apparatus for plastic material, comprising: a hopper having an opening in the bottom thereof; a rotatable shaft arranged transversely of the hopper; a cylinder rotatably positioned in the hopper and rotatably mounted upon said shaft; a plurality of vanes each slidably mounted in a slot in the cylinder and normally projecting from the peripheral face thereof; cam means in the hopper and associated with the cylinder for moving the vanes into and out of said slots, the outer edges of the extended vanes contacting the inner wall of the hopper to force material into said opening, said portion of the inner wall being adjacent to and above the hopper opening; an auxiliary feed drum also rotatably mounted in the hopper and positioned adjacent to the first cylinder and immediately above the area of contact of said vanes with said inner wall when the vanes are forcing material out of said opening; a plurality of spaced prongs projecting from said drum; a stripper member associated with said prongs for stripping material therefrom; a ratchet mounted on said shaft for rotation therewith; an associated pawl on the cylinder mounted for rotation therewith; means for rotating the shaft through a partial revolution and back again, said back rotation causing engagement of the ratchet with the pawl to rotate the cylinder so that the extended vanes on said cylinder move toward said opening, and spring means operatively connected to said rotating means for causing back rotation of the shaft.

6. A feeding apparatus for plastic material, comprising: a hopper having an opening in the bottom thereof; a cylinder rotatably mounted in the hopper above said hopper opening and arranged transversely of said hopper; at least one vane slidably mounted in a slot in said cylinder and normally projecting from the peripheral face thereof; means cooperating with said vane for moving the vane into and out of said slot so that the outer edge of the extended vane is in sliding engagement with a portion of the inner wall of the hopper, said inner wall portion being located adjacent to and above said opening and having a center of curvature substantially coinciding with the axis of rotation of said cylinder; and means for intermittently rotating said cylinder for moving said vane against said wall portion and toward said opening for forcing said plastic material out of said opening.

7. A feeding apparatus for plastic material, comprising: a hopper having an opening in the bottom thereof; a cylinder rotatably mounted in the hopper above said hopper opening and arranged transversely of said hopper; at least one vane mounted on said cylinder; means for moving the vane so that the outer end thereof is in sliding engagement with a portion of the inner wall of the hopper, said inner wall portion being located adjacent to and above said opening and having a center of curvature substantially coinciding with the axis of rotation of said cylinder; means for intermittently rotating said cylinder for moving said vane against said wall portion and toward said opening for forcing said plastic material out of said opening; an auxiliary feed drum also rotatably mounted in the hopper and positioned adjacent to said cylinder and immediately above the area of contact of said vane with said inner wall portion, said drum having an axis of rotation substantially parallel to the axis of rotation of said cylinder; a plurality of spaced prongs projecting from said drum, said prongs being contacted by said vane for rotation of said drum; and a stripper member associated with said prongs for stripping plastic material therefrom.

HARRY H. HOLLY.

REFERENCES CITED

The following references are of record in the file of this patent:

UNITED STATES PATENTS

| Number | Name | Date |
|---|---|---|
| 285,413 | Johnson | Sept. 25, 1883 |
| 354,944 | Spangler | Dec. 28, 1886 |
| 456,933 | Barron | Aug. 4, 1891 |
| 632,179 | Floyd | Aug. 29, 1899 |
| 709,793 | McGinnity | Sept. 23, 1902 |
| 1,069,083 | Gibson | July 29, 1913 |
| 1,345,865 | Little | July 6, 1920 |
| 1,381,864 | Evans et al. | June 14, 1921 |
| 1,755,618 | Watzl | Apr. 22, 1930 |
| 1,925,650 | Becker et al. | Sept. 5, 1933 |
| 1,965,741 | Jameson | July 10, 1934 |
| 2,150,659 | Santo | Mar. 14, 1939 |
| 2,212,070 | Luhrman | Aug. 20, 1940 |
| 2,292,196 | Brynoldt | Aug. 4, 1942 |
| 2,302,651 | Holly | Nov. 17, 1942 |

FOREIGN PATENTS

| Number | Country | Date |
|---|---|---|
| 4,797 | Great Britain | Apr. 6, 1886 |
| 5,487 | Great Britain | Apr. 12, 1915 |